(12) United States Patent
Nakamura et al.

(10) Patent No.: US 8,908,566 B2
(45) Date of Patent: Dec. 9, 2014

(54) COMMUNICATION MANAGEMENT DEVICE, COMMUNICATION DEVICE, AND COMMUNICATION METHOD

(75) Inventors: Masato Nakamura, Chiyoda-ku (JP); Tatsumi Yabusaki, Nagoya (JP); Tomitsugu Sugimoto, Nagoya (JP)

(73) Assignee: Mitsubishi Electric Corporation, Tokyo (JP)

( * ) Notice: Subject to any disclaimer, the term of this patent is extended or adjusted under 35 U.S.C. 154(b) by 47 days.

(21) Appl. No.: 13/142,244

(22) PCT Filed: Dec. 25, 2008

(86) PCT No.: PCT/JP2008/073632
§ 371 (c)(1),
(2), (4) Date: Jun. 24, 2011

(87) PCT Pub. No.: WO2010/073346
PCT Pub. Date: Jul. 1, 2010

(65) Prior Publication Data
US 2011/0261725 A1 Oct. 27, 2011

(51) Int. Cl.
| | | |
|---|---|---|
| *H04L 12/28* | (2006.01) | |
| *H04J 3/26* | (2006.01) | |
| *H04L 12/42* | (2006.01) | |
| *H04L 12/403* | (2006.01) | |
| *G06F 15/177* | (2006.01) | |
| *G06F 15/173* | (2006.01) | |
| *G06F 15/16* | (2006.01) | |
| *H04L 12/18* | (2006.01) | |
| *H04L 29/12* | (2006.01) | |
| *H04L 12/46* | (2006.01) | |

(52) U.S. Cl.
CPC ............ *H04L 12/42* (2013.01); *H04L 12/18* (2013.01); *H04L 12/4035* (2013.01); *H04L 29/12292* (2013.01); *H04L 29/12839* (2013.01); *H04L 61/2069* (2013.01); *H04L 61/6022* (2013.01); *H04L 12/4637* (2013.01)
USPC .......... 370/258; 370/390; 370/392; 370/403; 370/409; 370/432; 370/452; 709/220; 709/238; 709/251

(58) Field of Classification Search
USPC ......... 370/258, 390, 392, 403, 409, 432, 452; 709/220, 238, 251
See application file for complete search history.

(56) References Cited

U.S. PATENT DOCUMENTS 5,841,991 A * 11/1998 Russell ........................ 709/221
6,172,981 B1 * 1/2001 Cox et al. ..................... 370/401
(Continued)

FOREIGN PATENT DOCUMENTS

JP 03-065837 A 3/1991
JP 04-343543 A 11/1992
(Continued)

OTHER PUBLICATIONS

Taiwanese Office Action dated Jan. 28, 2013, issued in corresponding Taiwanese Patent Application No. 098100145.

*Primary Examiner* — Alpus H Hsu
*Assistant Examiner* — Yee Lam
(74) *Attorney, Agent, or Firm* — Sughrue Mion, PLLC; Richard C. Turner

(57) ABSTRACT

The communication management device includes a logical-ring configuring unit that determines a transmission order of a token frame in a network and configures a logical ring; a multicast-address generating unit that generates a multicast address from a MAC address of the communication management device; a multicast-address notifying unit that notifies a slave station configuring the logical ring of the multicast address; and a token-frame processing unit and a data-frame-communication processing unit that transmit a frame having a destination address to which the multicast address is set, and not performing a receiving process of a frame when a destination address of the received frame does not coincide with the multicast address.

10 Claims, 9 Drawing Sheets

(56) References Cited

U.S. PATENT DOCUMENTS

| | | |
|---|---|---|
| 6,320,871 B1 | 11/2001 | Mizuguchi et al. |
| 6,418,480 B1 * | 7/2002 | Rijhsinghani ................ 709/245 |
| 6,539,000 B1 | 3/2003 | Murai et al. |
| 6,556,574 B1 * | 4/2003 | Pearce et al. .................. 370/401 |
| 7,474,660 B1 * | 1/2009 | Pearce et al. ............... 370/395.3 |
| 2003/0048784 A1 | 3/2003 | Murai et al. |
| 2003/0084112 A1 * | 5/2003 | Curray et al. ................ 709/208 |
| 2005/0025083 A1 | 2/2005 | Murai et al. |
| 2008/0008192 A1 * | 1/2008 | Matoba ......................... 370/397 |
| 2009/0271001 A1 * | 10/2009 | Westphal et al. ................. 700/3 |
| 2009/0312853 A1 * | 12/2009 | Kore et al. ...................... 700/90 |

FOREIGN PATENT DOCUMENTS

| | | |
|---|---|---|
| JP | 11-163910 A | 6/1999 |
| JP | 2000-049778 A | 2/2000 |
| JP | 2005-348262 A | 12/2005 |
| JP | 3925660 B2 | 1/2007 |
| JP | 2007-243718 A | 9/2007 |

* cited by examiner

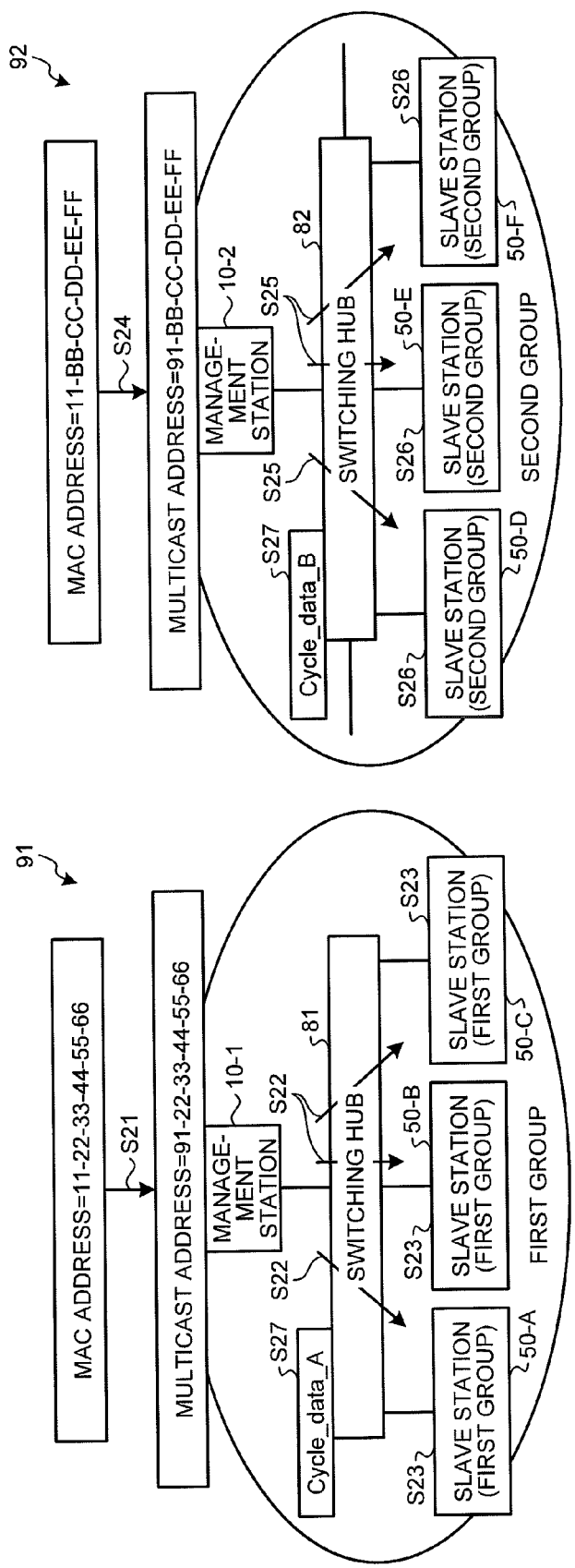

COMMUNICATION MANAGEMENT DEVICE, COMMUNICATION DEVICE, AND COMMUNICATION METHOD

CROSS REFERENCE TO RELATED APPLICATIONS

This application is a National Stage of International Application No. PCT/JP2008/073632 filed Dec. 25, 2008, the contents of all of which are incorporated herein by reference in their entirety.

TECHNICAL FIELD

The present invention relates to a communication management device, a communication device, and a communication method for performing communications using token frames between communication nodes connected via Ethernet®.

BACKGROUND ART

An FA (Factory Automation) system includes a control target device and a programmable controller that performs a predetermined arithmetic operation using a state of the control target device as input data and that outputs operating conditions of the control target device as output data. The FA system enables real-time control over the control target device by providing communication units in the programmable controller and the control target device, respectively and connecting the communication unit to each other via a network. That is, the communication unit provided in the control target device functions as a slave station and that provided in the programmable controller functions as a communication management station controlling data transmission from the slave station. The communication management station receives data from the slave station and periodically performs processes of calculating data for controlling the control target device using the received data and of transmitting the obtained data to the slave station. At this time, the communication management station controls a timing of transmitting data from each slave station so as to ensure real-time data communication.

In such FA systems, one master station is connected to a plurality of slave stations, and when the number of master stations is one, the master station normally performs network management. However, when a plurality of master stations and a plurality of slave stations managed by each master station are present in the same network segment, any one of the master stations plays a role of the communication management station (network management station). In this case, one master station and a plurality of slave stations managed by the master station configure one group and thus a plurality of groups are present in the same network segment. With this configuration, data communicated in each group is transmitted by multicast communication, thereby making it possible to distinguish data of one group from data of the other groups (see, for example, Patent Document 1).

Patent Document 1: Japanese Patent Application Laid-open No. H4-343543

DISCLOSURE OF INVENTION

Problem to be Solved by the Invention

However, in the FA system described in Patent Document 1, a network administrator classifies communication nodes in the FA system into groups so that the communication groups become unique to different networks (that is, different segments) provided in a factory, respectively. Accordingly, the possibilities become higher that a setting error occurs as the number of communication nodes provided in the FA system is larger. Furthermore, when the number of communication nodes increases, the number of network administrators increases as well. Therefore, the possibilities become higher that a setting error occurs due to settings by different network administrators, respectively. This setting error can cause the programmable controller to erroneously process data from a communication node that belongs to a different group.

The present invention has been achieved in view of the above problems, and an object of the present invention is to obtain a communication management device, a communication device, and a communication method that are capable of distinguishing data received from another network from data of a network to which a communication node belongs and eliminating the data even when a plurality of networks each of which is configured so that one communication management device (that is, a master station) is connected to a plurality of slave stations via Ethernet® are erroneously connected to one another via a switching hub or the like while the networks are operating.

Means for Solving Problem

In order to achieve the above-mentioned object, according to an aspect of the present invention, there is provided a communication management device that manages data transmission while circulating a token frame indicating a transmission right among communication nodes according to a cyclic order in a group, the group being formed by connecting one communication management device and at least one slave station by an Ethernet® cable in a same network segment, the communication management device including a logical-ring configuring unit that determines a transmission order of a token frame indicating a transmission right and configures a logical ring using the slave station and the communication management device present in a range where the token frame is transmitted by broadcast, a multicast-address generating unit that generates a multicast address from a MAC address of the communication management device, a multicast-address storage unit that stores the multicast address, a multicast-address notifying unit that notifies the slave station configuring the logical ring of the multicast address, and a frame-communication processing unit that transmits a frame having a destination address to which the multicast address is set, determines whether the destination address of a received frame coincides with the multicast address stored in the multicast-address storage unit, and switches the frame without performing a receiving process of the frame when the destination address of the received frame does not coincide with the multicast address.

Effect of the Invention

According to the present invention, the communication management device notifies a slave station configuring the logical ring of the multicast address generated from the MAC address of the communication management device, a frame is transmitted as a broadcast frame using this multicast address in the logical ring, and it is determined whether to perform a receiving process by whether the destination address of a received frame is the multicast address. As a result, even when a plurality of groups each including one communication management device (that is, a master station) and at least one slave station are wired in a complicated manner in different segments by Ethernet® or the like in a factory or the like, it is possible to dispense with setting for recovery from erroneous connection or to prevent malfunctioning of a recovery function for erroneous connection due to user's erroneous setting.

BRIEF DESCRIPTION OF DRAWINGS

FIG. 2-1 is an example of a format of an Ethernet® frame.

FIG. 2-2 depicts a format of a destination address.

FIG. 6-1 is a schematic diagram of an operation performed when a plurality of groups are inadvertently connected by a switching hub (part 1).

FIG. 6-2 is a schematic diagram of an operation performed when a plurality of groups are inadvertently connected by a switching hub (part 2).

EXPLANATIONS OF LETTERS OR NUMERALS

Figure 1:
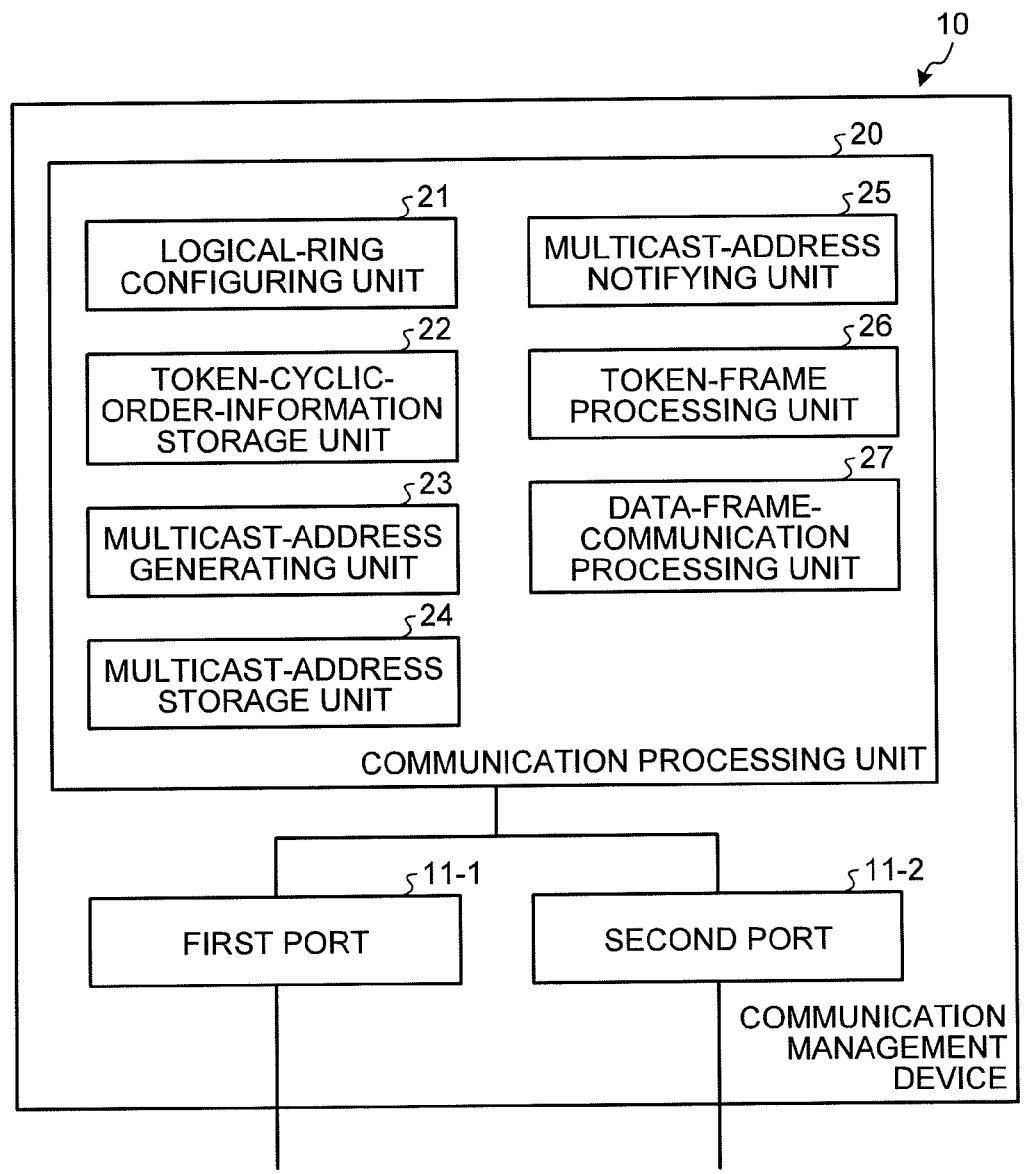
FIG. 1 is a block diagram schematically depicting a functional configuration of a communication management device according to a first embodiment of the present invention.

10 Communication management device
11-1, 11-2, 51-1, 51-2 Port
20, 60 Communication processing unit
21 Logical-ring configuring unit
22 Token-cyclic-order-information storage unit
23 Multicast-address generating unit
24, 62 Multicast-address storage unit
25 Multicast-address notifying unit
26, 63 Token-frame processing unit
27, 64 Data-frame-communication processing unit
50 Slave station
61 Token-cycle-destination-information storage unit

BEST MODE(S) FOR CARRYING OUT THE INVENTION

Exemplary embodiments of a communication management device, a communication device, and a communication method according to the present invention will be explained below in detail with reference to the accompanying drawings. The present invention is not limited to the embodiments.

First Embodiment

FIG. 1 is a block diagram schematically depicting a functional configuration of a communication management device according to a first embodiment of the present invention. A communication management device (a master station) 10 includes two ports 11-1 and 11-2 for connecting the communication management device 10 to an adjacent communication node (a slave station) or a switching hub by an Ethernet® (hereinafter, "®" is omitted) cable, and a communication processing unit 20 that performs processes such as frame transmission and reception processes and a process of establishing an order of transmitting a token frame.

The ports 11-1 and 11-2 are two ports, that is, the first port 11-1 and the second port 11-2. It suffices that at least one of these two ports 11-1 and 11-2 is connected to a port of the adjacent slave station (or a port of the slave station via a switching hub).

The communication processing unit 20 includes a logical-ring configuring unit 21, a token-cyclic-order-information storage unit 22, a multicast-address generating unit 23, a multicast-address storage unit 24, a multicast-address notifying unit 25, a token-frame processing unit 26, and a data-frame-communication processing unit 27. The token-frame processing unit 26 and the data-frame communication processing unit 27 correspond to a frame-communication processing unit.

The logical-ring configuring unit 21 detects communication nodes (slave stations) present in the same network segment as that to which the communication management device 10 belongs whenever the communication management device 10 is turned on or at predetermined time intervals. The logical-ring configuring unit 21 performs a logical-ring configuring process of determining token cyclic order information that is an order of circulating (passing) a token frame that is a data transmission right based on a connection relation of the communication nodes. "Logical ring" means a logical ring configured and formed to sequentially pass a data transmission right (a token frame) among communication nodes in a network in a physical network configuration in which one communication management device (that is, a master station) 10 and at least one slave station are connected by an Ethernet cable in the form of a star or line. Furthermore, the logical-ring configuring unit 21 notifies the other communication node (a slave station) present in the same network segment of token cycle destination information including a communication node that is to acquire the transmission right next to the communication node having currently the transmission right. The token cyclic order information can be used as this token cycle destination information.

The token-cyclic-order-information storage unit 22 stores the token cyclic order information determined by the logical-ring configuring unit 21.

The multicast-address generating unit 23 generates a multicast address used in communications performed in a network (a group) including the slave station managed by the communication management device 10 from a MAC (Media Access Control) address uniquely assigned to the communication management device 10. This multicast address plays a role of group identification information for identifying the group.

Figures 1, 2:
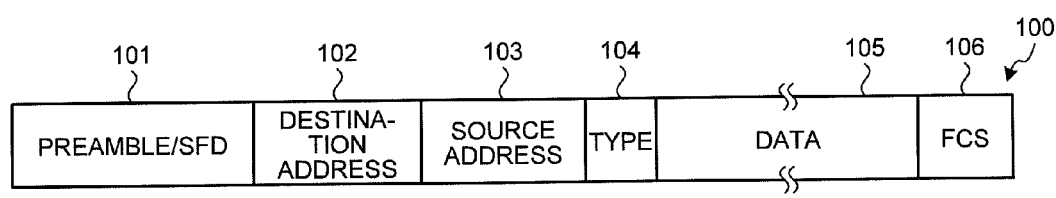
Figure 2:
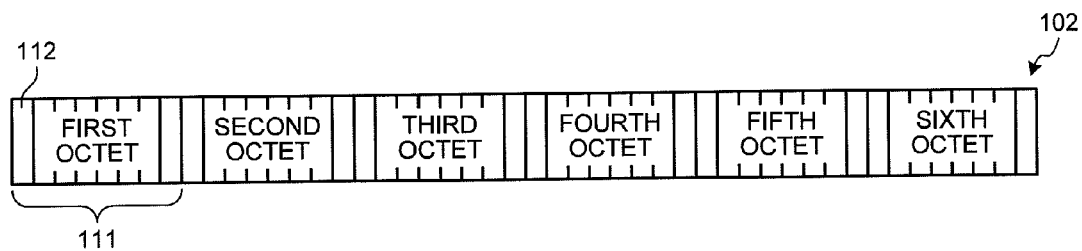

A method of generating a multicast address is described below. FIG. 2-1 is an example of a format of an Ethernet frame and FIG. 2-2 depicts a format of a destination address. An Ethernet frame 100 includes an eight-octet preamble/SFD (Start Frame Delimiter) 101 that indicates start of transmission of the Ethernet frame 100 and start of the destination address, a six-octet destination address 102 that indicates a transmission destination of the Ethernet frame 100, a six-octet source address 103 that indicates a source of the Ethernet frame 100, a two-octet type 104 that indicates a type of the Ethernet frame 100, 46 to 1,500-octet data 105 that stores data to be transmitted, and a four-octet FCS (Frame Check Sequence) 106 for detecting an error in the Ethernet frame 100. A token frame or a data frame to be described later has the same structure as that of the Ethernet frame 100.

Moreover, as shown in FIG. 2-2, the destination address 102 of the Ethernet frame consists of 48 bits (six octets) and is defined as follows. When an I/G bit (a leading bit) 112 of a first octet 111 is set to be "0", the destination address 102 is a unicast address. When it is "1", the destination address 102 is set to be a multicast address.

Therefore, it is assumed in the first embodiment that the MAC address which is uniquely assigned to the communication management device 10 and the I/G bit 112 of which is set to "1" is a multicast address used in the network (group) managed by the communication management device 10. Because the MAC address itself is unique, the multicast address obtained by changing the I/G bit 112 of this MAC address to "1" is unique as well.

Figure 3:
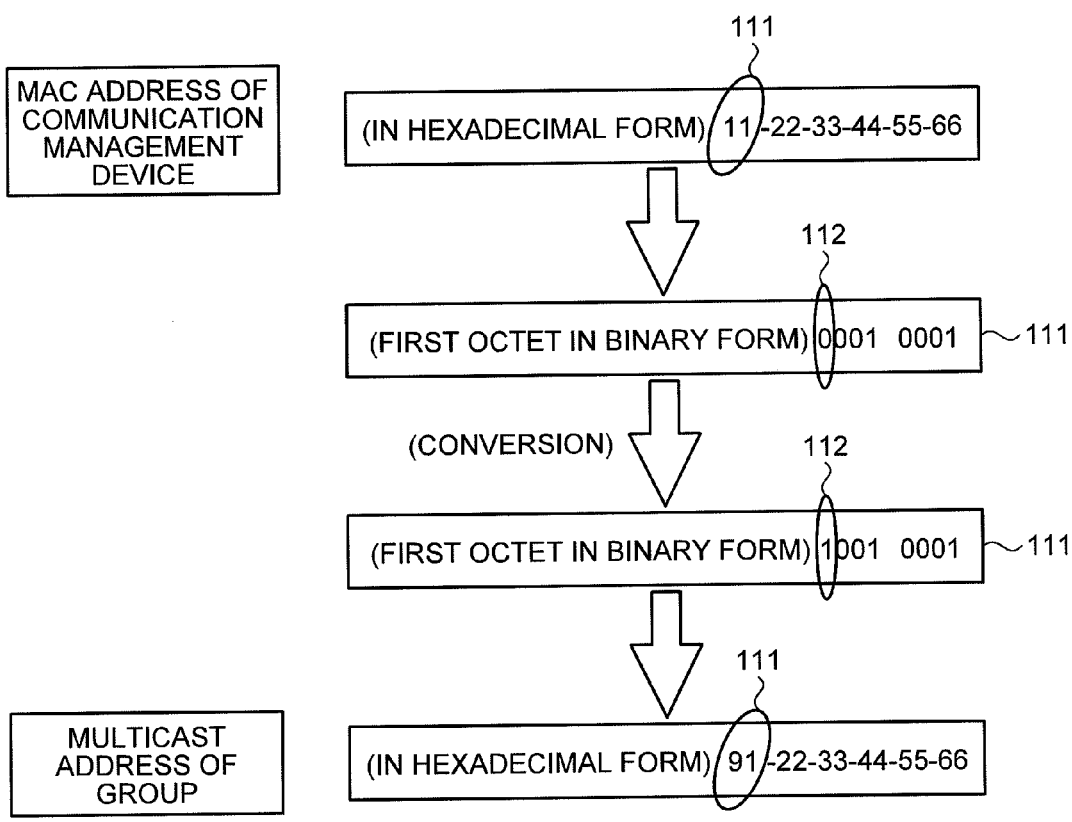
FIG. 3 is an example of a method of generating a multicast address from a MAC address.

FIG. 3 is an example of a method of generating a multicast address from the MAC address. When the MAC address (in a hexadecimal form) of the communication management device 10 is "11-22-33-44-55-66", "11" of the first octet 111 is expressed as "00010001" in a binary form. When the above rule applies to the first octet 111 and the leading bit (the I/G bit) 112 of the first octet 111 of eight bits is set to "1", "11" of the first octet 111 is "10010001". This "10010001" is expressed as "91" in a hexadecimal form. As a result, the multicast address of the network (group) formed by this communication management device 10 is "91-22-33-44-55-66". This is only an example, and multicast addresses can be similarly generated for the other MAC addresses.

The multicast-address storage unit 24 stores the multicast address generated by the multicast-address generating unit 23. The multicast address stored in the multicast-address storage unit 24 is used by the token-frame processing unit 26 and the data-frame-communication processing unit 27 as information for identifying a network group while transmitting a frame in the group.

The multicast-address notifying unit 25 notifies the slave station connected to the communication management device 10 or, to be specific, the slave station present in a range where a frame can be transmitted by broadcast of the multicast address.

The token-frame processing unit 26 generates a token frame based on the Ethernet frame 100 and transmits the token frame based on the token cyclic order information when the logical-ring configuring unit 21 is finished with the logical-ring configuring process and the multicast-address notifying unit 25 is completed with notifying the slave station of the multicast address. For example, the token-frame processing unit 26 generates the token frame in which a value indicating the token frame is set to the type 104, transmission-right acquiring device information indicating a MAC address of the communication node that acquires the transmission right next is set into the data 105, and the multicast address stored in the multicast-address storage unit 24 is set to the destination address 102 in the Ethernet frame 100 shown in FIG. 2-1, and transmits the token frame by broadcast. That is, in the first embodiment, the token-frame processing unit 26 sets the multicast address to the destination address 102 instead of a broadcast address and broadcasts the token frame when the multicast address is stored in the multicast-address storage unit 24 while the token frame is conventionally transmitted by broadcast.

The token-frame processing unit 26 determines whether the destination address 102 coincides with the multicast address stored in the multicast-address storage unit 24 when the communication management device 10 receives a token frame transmitted from another communication node (another slave station), and when the destination address 102 does not coincide with the multicast address stored in the multicast-address storage unit 24, the token-frame processing unit 26 does not perform a receiving process of the token frame. When the destination address 102 coincides with the multicast address stored in the multicast-address storage unit 24, the token-frame processing unit 26 compares the transmission-right acquiring device information in the data 105 of the token frame with the MAC address of the communication management device. When the transmission-right acquiring device information coincides with the MAC address, the token-frame processing unit 26 determines that the communication management device 10 has acquired the transmission right and instructs the data-frame-communication processing unit 27 to perform a transmitting process of a data frame, and when the transmission-right acquiring device information does not coincide with the MAC address, the token-frame processing unit 26 determines that communication management device 10 has not acquired the transmission right yet. In either case, the received token frame is switched to the other port than the port at which the token frame is received.

The data-frame-communication processing unit 27 performs transmitting and receiving processes of transmitting and receiving a data frame. Specifically, the data-frame-communication processing unit 27 determines whether the destination address 102 of a received data frame coincides with the multicast address stored in the multicast-address storage unit 24, and when the destination address 102 of the received data frame does not coincide with the multicast address stored in the multicast-address storage unit 24, the data-frame-communication processing unit 27 does not perform the receiving process of the data frame. When the destination address 102 of the received data frame coincides with the multicast address stored in the multicast-address storage unit 24, the data-frame-communication processing unit 27 performs the receiving process. When the communication management device 10 acquires the transmission right, the data-frame-communication processing unit 27 generates and transmits a data frame based on the Ethernet frame 100. For example, the data-frame-communication processing unit 27 generates a data frame in which a value indicating the data frame is set to the type 104, data to be transmitted is set to the data 105, and the multicast address stored in the multicast-address storage unit 24 is set to the destination address in the Ethernet frame 100 shown in FIG. 2-1, and transmits the data frame to the slave station by broadcast. That is, in the first embodiment, when the multicast address is stored in the multicast-address storage unit 24, the data-frame-communication processing unit 27 sets the multicast address to the destination address 102 instead of a broadcast address and transmits the data frame by broadcast while the data frame is conventionally transmitted by broadcast. In this case, the MAC address that indicates to which slave station the data frame is transmitted is provided into the data 105 as destination device information or information indicating to which salve station data is transmitted is added to the data stored in the data 105. Furthermore, the data-frame-communication processing unit 27 also includes a function to transfer (switch) a data frame addressed to another slave station.

Figure 4:
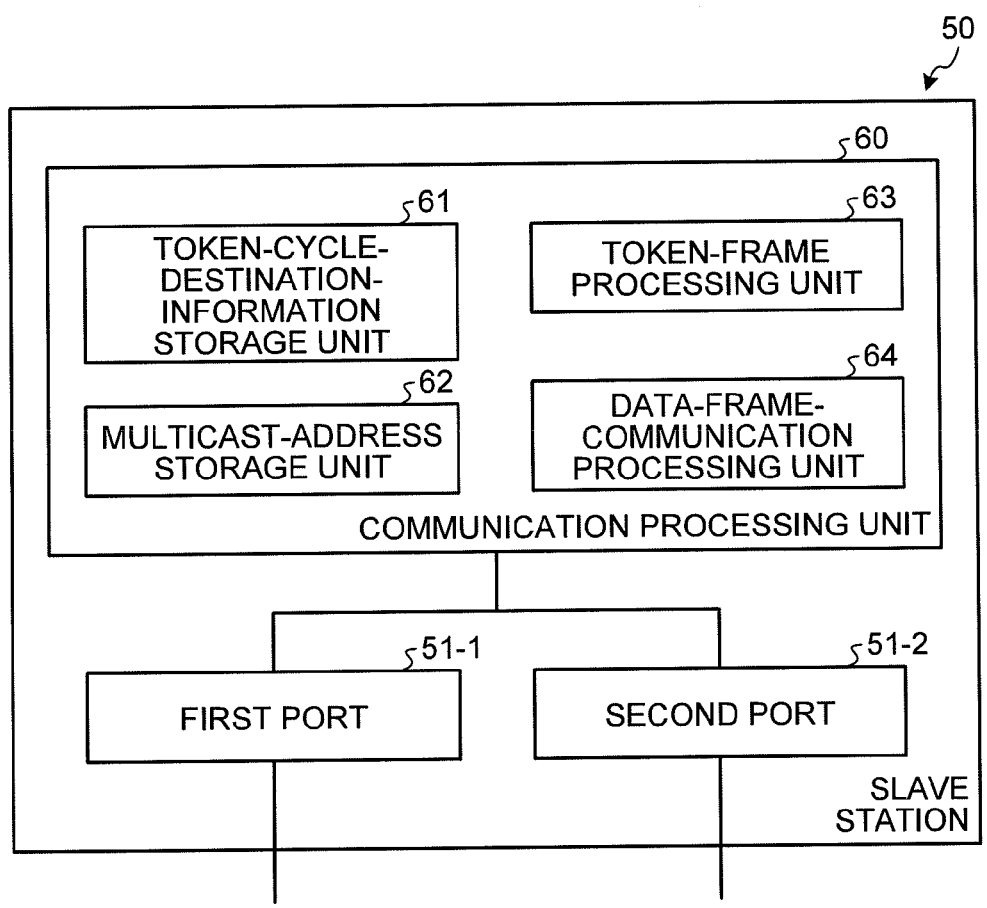
FIG. 4 is a block diagram schematically depicting a functional configuration of a slave station.

FIG. 4 is a block diagram schematically depicting a functional configuration of the slave station. A slave station 50 includes two ports 51-1 and 51-2 for connecting the slave station 50 to the adjacent communication node (the communication management device 10 or the slave station 50) or a switching hub by an Ethernet cable, and a communication processing unit 60 that performs transmitting and receiving processes of transmitting and receiving a frame via the port 51-1 or 51-2.

Similarly to the communication management device 10, the ports 51-1 and 51-2 are two ports, that is, the first port 51-1 and the second port 51-2. It suffices that at least one of these two ports 51-1 and 51-2 is connected to the communication node (or the communication node via a switching hub).

The communication processing unit 60 includes a token-cycle-destination-information storage unit 61, a multicast-address storage unit 62, a token-frame processing unit 63, and a data-frame-communication processing unit 64. The token-frame processing unit 63 and the data-frame-communication processing unit 64 correspond to a frame-communication processing unit.

The token-cycle-destination-information storage unit 61 stores token cycle destination information notified by the communication management device 10. It is assumed that the token-cycle-destination-information storage unit 61 stores only a MAC address of a communication node that acquires the transmission right next to the slave station 50.

The multicast-address storage unit 62 stores the multicast address of the group, the multicast address of which is received from the communication management device 10 and to which group the slave station 50 including the multicast-address storage unit 62 belongs. This multicast address is generated by the communication management device 10 from the MAC address of the communication management device 10 according to the rule explained in FIG. 3, and also serves as information for identifying the group in which the communication management device 10 is present.

When the slave station 50 receives the token frame transmitted from another communication node (the communication management device 10 or the slave station 50), the token-frame processing unit 63 determines whether the destination address 102 of the token frame coincides with the multicast address stored in the multicast-address storage unit 62, and when the destination address 102 of the token frame does not coincide with the multicast address stored in the multicast-address storage unit 62, the token-frame processing unit 63 does not perform a receiving process of the token frame. When the destination address 102 of the token frame coincides with the multicast address stored in the multicast-address storage unit 62, the token-frame processing unit 63 compares the transmission right acquiring device information in the data 105 of the token frame with a MAC address of the slave station 50. When the transmission right acquiring device information coincides with the MAC address, the token-frame processing unit 63 determines that the slave station 50 has acquired the transmission right and instructs the data-frame-communication processing unit 64 to perform a transmitting process of a data frame, and when the transmission right acquiring device information does not coincide with the MAC address, the token-frame processing unit 63 determines that the slave station 50 has not acquired the transmission right yet. In either case, the token frame is switched to the other port than the port at which the token frame is received.

Furthermore, after the slave station 50 acquires the transmission right and the data-frame-communication processing unit 64 finishes transmitting the data frame, the token-frame processing unit 63 sets the token cycle destination information stored in the token-cycle-destination-information storage unit 61 to the transmission right acquiring device information on the received token frame and sets the multicast address stored in the multicast-address storage unit 62 to the destination address 102, and transmits the token frame by broadcast. That is, in the first embodiment, the token-frame processing unit 63 sets the multicast address to the destination address 102 instead of a broadcast address and transmits the token frame by broadcast when the multicast address is stored in the multicast-address storage unit 62 while the token frame is conventionally transmitted by broadcast.

The data-frame-communication processing unit 64 performs data-frame transmitting and receiving processes. Specifically, the data-frame-communication processing unit 64 determines whether the destination address 102 of a received data frame coincides with the multicast address stored in the multicast-address storage unit 62, and when the destination address 102 of the received data frame does not coincide with the multicast address stored in the multicast-address storage unit 62, the data-frame-communication processing unit 64 does not perform the receiving process of the data frame. When the destination address 102 of the received data frame coincides with the multicast address stored in the multicast-address storage unit 62, the data-frame-communication processing unit 64 performs the receiving process of the data frame. When the slave station 50 acquires the transmission right, the data-frame-communication processing unit 64 generates a data frame in which a value indicating the data frame is set to the type 104, data to be transmitted is set to the data 105, and the multicast address stored in the multicast-address storage unit 62 is set to the destination address 102 and transmits the data frame to the communication management device 10 or another slave station 50 by broadcast. That is, in the first embodiment, when the multicast address is stored in the multicast-address storage unit 62, the data-frame-communication processing unit 64 sets the multicast address to the destination address 102 instead of a broadcast address and transmits the data frame by broadcast while the data frame is conventionally transmitted by broadcast. Furthermore, the data-frame-communication processing unit 64 also includes a function to transfer (switch) a data frame addressed to another communication node.

Figure 5:
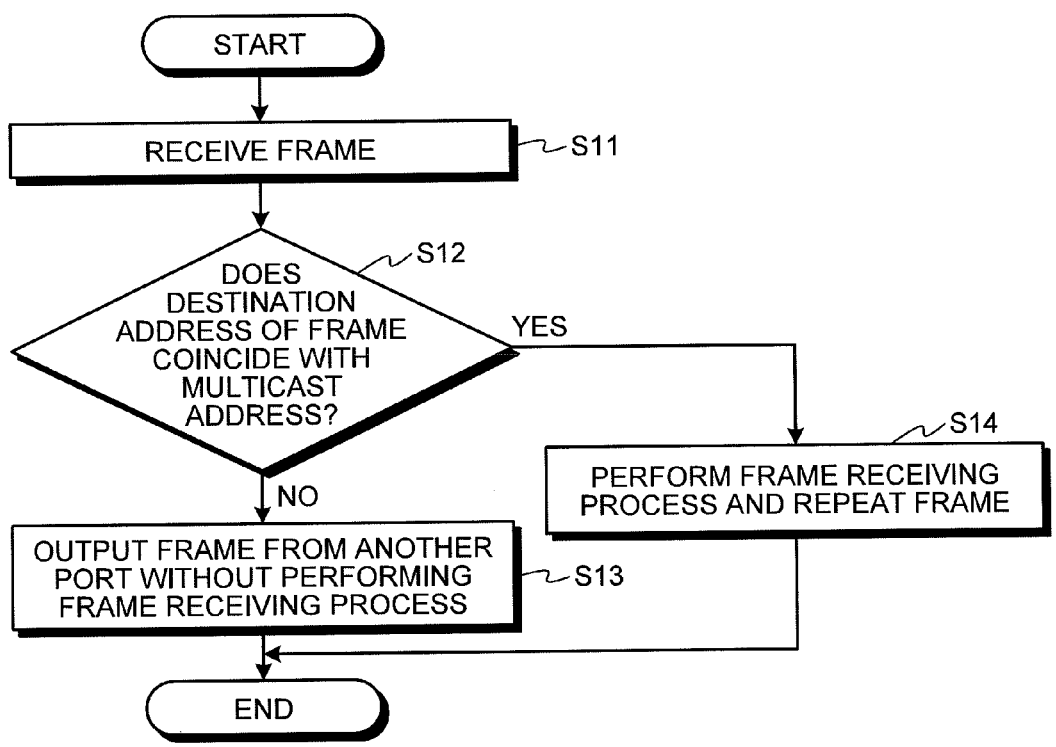
FIG. 5 is a flowchart of an example of a process performed by a communication node according to the first embodiment when it receives a frame.

A method of processing data received by the communication management device 10 or the slave station 50 is explained next. FIG. 5 is a flowchart of an example of a process performed by a communication node according to the first embodiment when it receives a frame. The process shown in FIG. 5 is performed, for example, by the token-frame processing unit 26 or 63 when the communication node receives a token frame, and performed by the data-frame-communication processing unit 27 or 64 when the communication node receives a data frame.

First, when the communication node receives the token frame or data frame (Step S11), it is determined whether the destination address 102 in the Ethernet frame coincides with the multicast address stored in the multicast-address storage unit 24 or 62 (Step S12). When the destination address 102 does not coincide with the multicast address of the group to which the communication node belongs (NO at Step S12), the communication node does not perform the receiving process of the frame, outputs the frame from another port (Step S13), and finishes the process.

On the other hand, when the destination address 102 coincides with the multicast address of the group to which the communication node belongs (YES at Step S12), the communication node determines that the received frame is the frame of the group, performs the receiving process, and performs a process of repeating the received frame (Step S14). For example, the receiving process is a process of determining whether the communication node that receives the frame has the transmission right when the frame is the token frame or a process of receiving the data addressed to the communication node when the frame is the data frame. The process is then finished.

After one communication management device (that is, a master station) 10 and at least one slave station 50 configured as described above configure one group, the communication management device (that is, the master station) 10 notifies the slave stations 50 in the group of the multicast address. Accordingly, after notification of the multicast address, the frame to be transmitted by broadcast is transmitted by broadcast by setting the multicast address to the destination address of the frame and a range of receiving the frame is classified into a group. As a result, even when a communication management device 10 and at least one slave station 50 managed by the communication management device 10 configure a new group and the new group is connected to the same network segment, an intergroup communication can be performed in the former group without any influence of the latter or new group. When the destination address of a frame transmitted from another group does not coincide with the multicast address of one group in the data receiving process, particularly, each communication node belonging to one group does not receive the frame. This can prevent one group from erroneously using the data frame transmitted from another group.

Figures 2, 6:
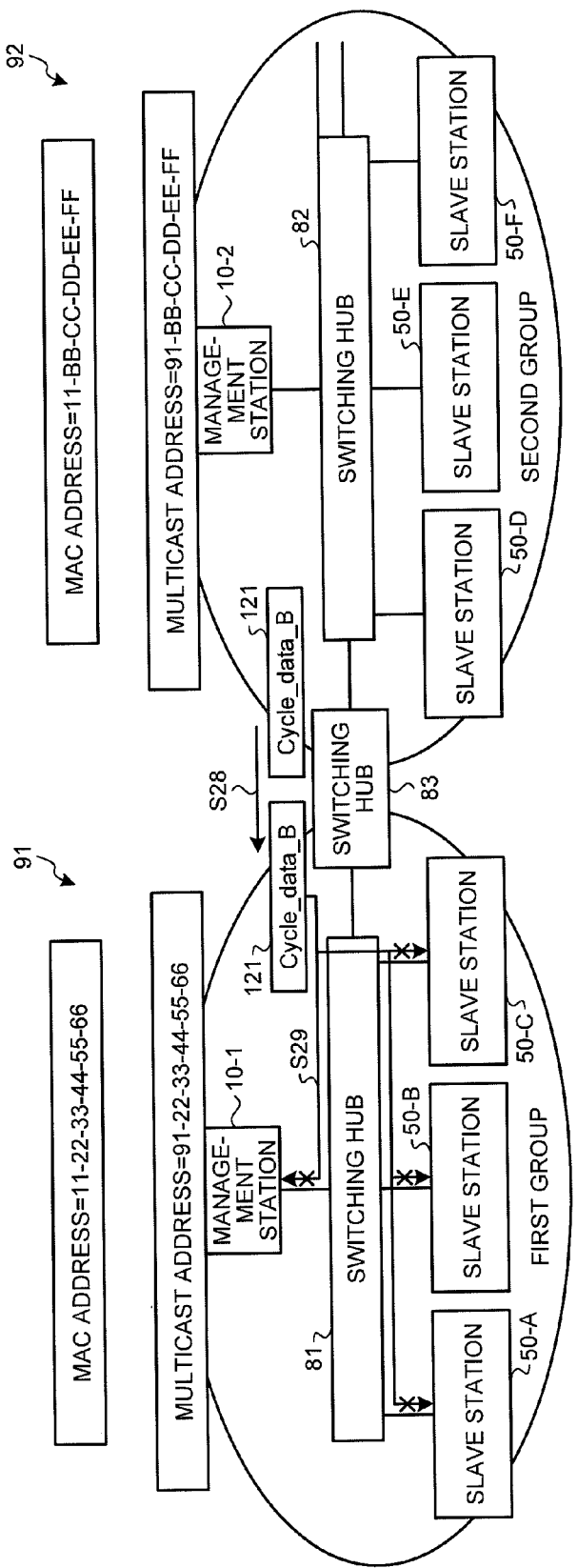

A process performed when one network segment is erroneously connected to a different network segment is explained next. FIGS. 6-1 to 6-2 are schematic diagrams of an operation performed when a plurality of groups are inadvertently connected by a switching hub. In this case, as shown in FIG. 6-1, one communication management device (denoted as "management station" in FIGS. 6-1 and 6-2) 10-1 and three slave stations 50-A, 50-B, and 50-C are connected by Ethernet cables via a switching hub 81 and configure a group 91. It is assumed that a MAC address of the communication management device 10-1 in this first group 91 is "11-22-33-44-55-66". The multicast-address generating unit 23 of the communication management device 10-1 generates a multicast address "91-22-33-44-55-66" to be used in the first group 91 from the MAC address of the communication management device 10-1 (S21). The generated multicast address is stored in the multicast-address storage unit 24.

Thereafter, the logical-ring configuring unit 21 of the communication management device 10-1 performs a logical-ring configuring process, a token-cycle-destination-information notifying process and the like on the slave stations 50-A, 50-B, and 50-C present in the range that a frame reaches by broadcast. The token-frame processing unit 26 issues a token frame according to the token cyclic order information. It is assumed that no other communication device than the communication management device 10-1 is present in the network. From the logical-ring configuring process to a token-frame issuing process, the multicast-address notifying unit 25 notifies the slave stations 50-A, 50-B, and 50-C configuring the logical ring of the multicast address (S22). Further, the slave stations 50-A, 50-B, and 50-C store the notified multicast address in the multicast-address storage units 62, respectively. As a result, the slave stations 50-A, 50-B, and 50-C recognize the network group 91 (neighbors of the communication management device 10-1 in the logical ring thereof) to which the slave stations 50-A, 50-B, and 50-C belong (S23).

Similarly, as for a second group in which one communication management device (that is, a master station) 10-2 and three slave stations 50-D, 50-E, and 50-F are connected by Ethernet cables via a switching hub 82, the communication management device 10-2 generates a multicast address (S24) and notifies the slave stations 50-D, 50-E, and 50-F of the generated multicast address (S25). The slave stations 50-D, 50-E, and 50-F recognize a network group 92 to which the slave stations 50-D, 50-E, and 50-F belong (S26). Note that a MAC address of the communication management device 10-2 in this second group is "11-BB-CC-DD-EE-FF" and that the multicast address generated from this MAC address is "91-BB-CC-DD-EE-FF".

Thereafter, in each of the first group 91 and the second group 92, a token frame of which the multicast address set by each of the group 91 or 92 is set as the destination address is issued by broadcast, the communication node that is set based on the transmission right acquiring device information in the token frame acquires the transmission right, the multicast address is set to a destination address of a data frame, and the data frame is transmitted by broadcast (S27). Specifically, "91-22-33-44-55-66" is used as the multicast address in the first group 91, "91-BB-CC-DD-EE-FF" is used as the multicast address in the second group 92, and frames are transmitted by broadcast, respectively. By doing so, when the first and second groups 91 and 92 are FA systems, for example, cyclic communications are performed in the respective groups 91 and 92. Furthermore, data to be transmitted in the first and second groups 91 and 92 is denoted by "Cycle_data_A" and "Cycle_data_B", respectively in FIG. 6-1.

At this time, the communication nodes in each group receive the frame when the destination address of the received token frame or data frame is the multicast address of the group; otherwise, the communication nodes in each group do not perform the receiving process of the frame. In this state of FIG. 6-1, the first and second groups 91 and 92 are independent of each other, so that the communication nodes in each of the groups 91 and 92 do not receive the frames to which the multicast address of the other group is set.

Thereafter, as shown in FIG. 6-2, it is assumed that an operator erroneously connects the first group 91 to the second group 92 via a switching hub 83. At this time, the first and second groups 91 and 92 are connected to each other via the switching hub 83, so that the first and second groups 91 and 92 configure the same network segment. That is, the frame (Ethernet frame) output from the communication nodes in one group inadvertently reaches the communication nodes in the other group via the switching hub 83.

After the first and second groups 91 and 92 are erroneously connected as described above, a data frame 121 output from one of the communication nodes in the second group 92, for example, enters the first group 91 via the switching hub 83 (S28). However, even in this case, the communication nodes (the communication management device 10-1 and the slave stations 50-A, 50-B, and 50-C) in the first group 91 do not perform the receiving process of the frame 121 because a destination address of the received data frame 121 does not coincide with the multicast address of the first group 91 (S29). The same is true for a frame output from the first group 91 and entering the second group 92.

With this configuration, even when a plurality of the groups 91 and 92 are present in the same network segment and the frame of the first group 91 enters the second group 92, processes performed by the communication nodes in the first group 91 are immune to disturbance by the frame from the second group 92.

According to the first embodiment, the communication management device 10 notifies the slave station 50 that is present on the same logical ring and that forms one group of the multicast address generated from the MAC address of the communication management device 10, sets a destination address of the frame by using the multicast address notified in the one group, and transmits the frame to the destination address by broadcast. Therefore, each of the communication nodes 10 and 50 can perform processes while distinguishing the frame in the group to which the communication node belongs from that in the other group.

Further, the communication management device 10 generates the multicast address from the MAC address of the communication management device 10. Therefore, the multicast address is unique to each group and multicast addresses do not overlap among a plurality of groups. Further, the communication management device 10 notifies the slave stations 50 present on the logical ring of the multicast address and each of the slave stations 50 stores the multicast address. Therefore, it is possible to prevent occurrence of erroneous settings of the multicast address such as an operator's setting.

Furthermore, each of the communication nodes 10 and 50 compares the destination address of the received frame with the multicast address of the group to which the communication node belongs and determines whether to perform the receiving process of a frame. Therefore, even when a plurality of groups are erroneously connected either directly or via a switching hub while the groups are operating after forming the groups and the communication nodes in one group receive a frame from another group, the communication nodes do not perform the receiving process of the frame. That is, even when an operator inadvertently connects different groups over Ethernet, the programmable controller or the like connected to the communication management device 10 is prevented from performing an arithmetic operation using erroneous data, thereby making it possible to prevent the system from malfunctioning.

Second Embodiment

In the first embodiment, each communication node compares the destination address of the received frame with the multicast address of the group to which the communication node belongs and determines whether to perform a data receiving process. In this case, for example, as shown in FIG. 6-2, when the frame 121 flows from the second group 92 into the first group 91, then all the communication nodes 10-1, 50-A, 50-B, and 50-C in the first group 91 receive the frame from the second group 92, and unnecessary communication takes place in the first group 91. Therefore, in a second embodiment of the present invention, a communication method capable of suppressing a frame from another group from being communicated in one group is described.

Each of the communication management device 10 (that is, a master station) and the slave stations 50 according to the second embodiment is configured to provide the token-frame processing unit 26 or 63 shown in FIG. 1 or 4 according to the first embodiment with a function of not passing a token frame to the other port when the destination address 102 of the received token frame differs from the multicast address stored in the multicast-address storage unit 24 or 62. Similarly, the data-frame-communication processing units 27 and 64 are provided with a function of not passing a data frame to the other port when the destination address 102 of the received data frame differs from the multicast address stored in the multicast-address storage unit 24 or 62. While other elements of the second embodiment are identical to those of the first embodiment, explanations thereof will be omitted.

Figure 7:
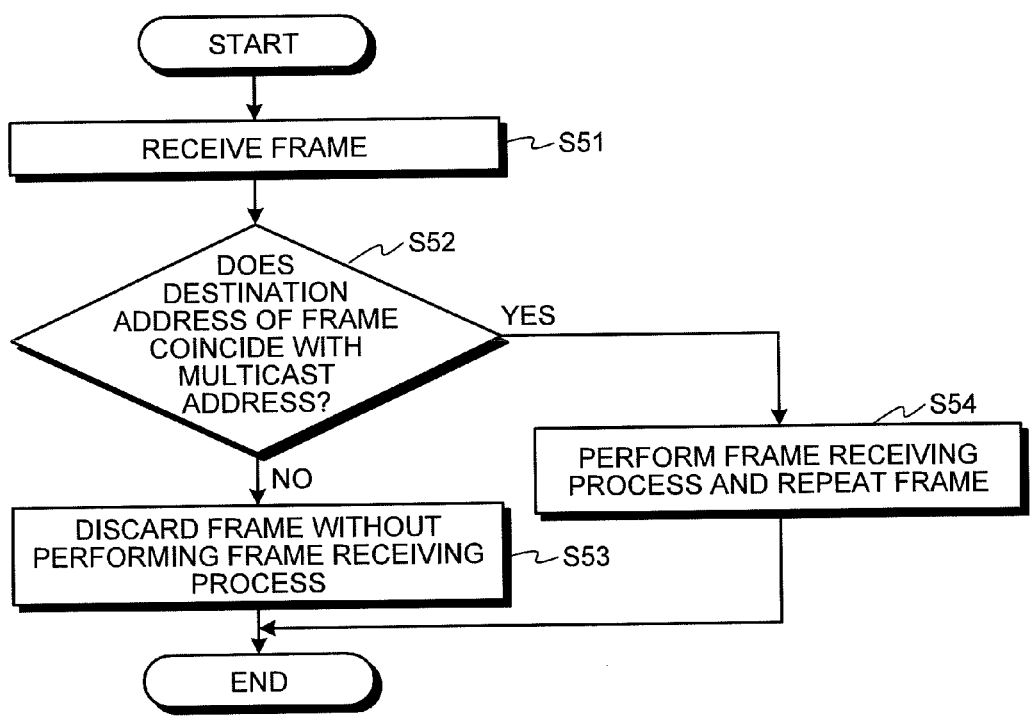
FIG. 7 is a flowchart of an example of frame processing performed by a communication node according to a second embodiment of the present invention.

FIG. 7 is a flowchart of an example of frame processing performed by a communication node according to the second embodiment. For example, the process shown in FIG. 7 is performed by the token-frame processing unit 26 or 63 when the communication node receives a token frame, and performed by the data-frame-communication processing unit 27 or 64 when the communication node receives a data frame.

First, when the communication node receives the token frame or data frame (Step S51), it is determined whether the destination address 102 in the frame coincides with the multicast address stored in the multicast-address storage unit 24 or 62 (Step S52). When the destination address 102 does not coincide with the multicast address of the group to which the communication node belongs (NO at Step S52), the communication node does not perform the receiving process of the frame but discards the frame (Step S53). That is, the communication node does not pass the received frame to the other port other than the port at which the frame is received. The process is then finished.

On the other hand, when the destination address 102 coincides with the multicast address of the group to which the communication node belongs (YES at Step S52), the communication node then determines that the received frame is the frame of the group to which the communication node belongs, performs the receiving process, and performs a process of repeating the received frame (Step S54). For example, the receiving process is a process of determining whether the communication node that receives the frame has a transmission right when the frame is a token frame or a process of receiving data addressed to the communication node when the frame is a data frame. The process is then finished.

Figure 8:
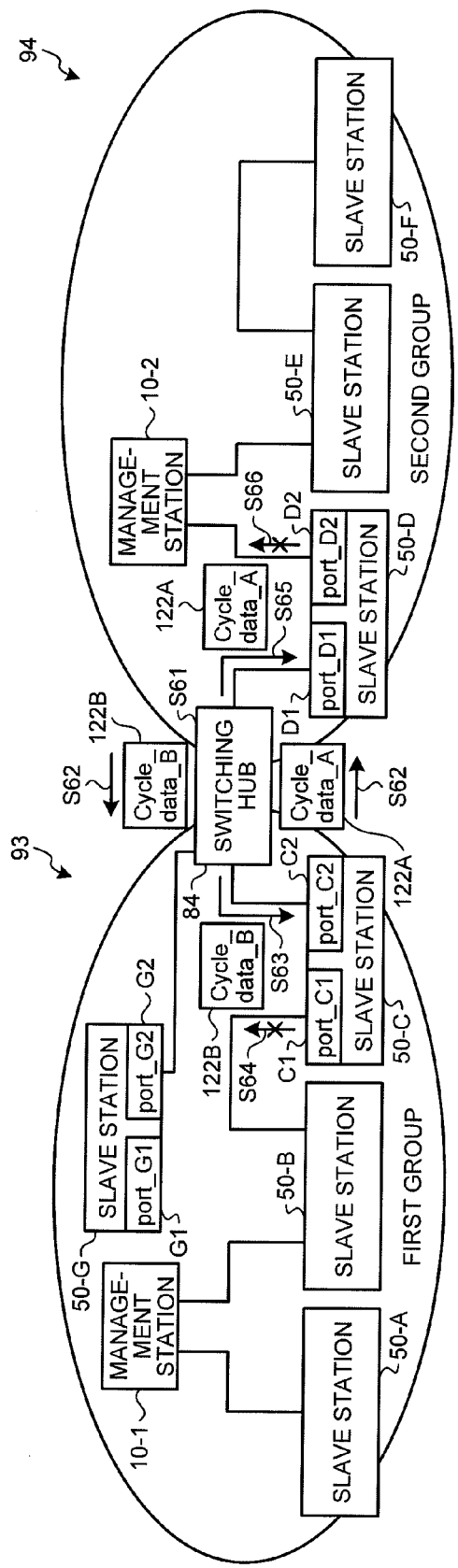
FIG. 8 is a schematic diagram of a data flow when two groups having different multicast addresses are inadvertently connected.

FIG. 8 is a schematic diagram of a data flow when two groups having different multicast addresses are inadvertently connected. FIG. 8 depicts a communication system in which a first group 93 including the communication management device 10-1 and slave stations 50-A, 50-B, 50-C, and 50-G and a second group including the communication management device 10-2 and the slave stations 50-D, 50-E, and 50-F are connected to each other via a switching hub 84.

In the first group 93, the slave station 50-A is connected to one port of the communication management device 10-1 in the form of a line, the slave stations 50-B, 50-C, and 50-G are connected to the other port of the communication management device 10-1 in the form of lines, and the slave station 50-G is connected to the slave station 50-C via the switching hub 84. Furthermore, in a second group 94, the slave station 50-D is connected to one port of the communication management device 10-2 in the form of a line, and the slave stations 50-E and 50-F are connected to the other port of the communication management device 10-2 in the form of lines. The first and second groups 93 and 94 are not connected but communications are performed using multicast addresses generated from MAC addresses of the communication management devices 10-1 and 10-2 in the groups 93 and 94, respectively as described in the first embodiment.

When an operator erroneously connects the slave station 50-D to the switching hub 84 of the first group 93 (S61), a frame 122B (denoted by "Cycle_data_B" in FIG. 8) of the second group 94 enters the first group 93, and a frame 122A (denoted by "Cycle_data_A" in FIG. 8) of the first group 93 enters the second group 94 (S62).

At this time, the slave station 50-C located on a boundary of the first group 93 with the second group 94 performs the process shown in FIG. 7 described above and receives the frame from the second group 94 at a second port C2 connected to the switching hub 84 (S63). However, because the destination address 102 of the frame differs from the multicast address of the group 93, the slave station 50-C discards the frame without outputting the frame from a first port C1 (S64). As a result, the frame 122B from the second group 94 is not output from the first port C1 of the slave station 50-C and therefore does not reach the communication management device 10-1 and the other slave stations 50-A and 50-B.

Similarly, the slave station 50-D located on a boundary of the second group 94 with the first group 93 receives the frame 122A from the first group 93 at a first port D1 connected to the switching hub 84 (S65). However, the slave station 50-D discards the frame 122A of the first group 93 without outputting the frame 122A from a second port D2 (S66). As a result, the frame 122A from the first group 93 is not output from the second port D2 of the slave station 50-D and therefore does not reach the communication management device 10-2 and the other slave stations 50-E and 50-F.

The slave station 50-G in the first group 93 receives the frame 122B of the second group 94 at second port G2. However, because no network is present ahead of the first port G1, the slave station 50-G cannot output the received frame 122B of the second group 94.

According to the second embodiment, when a plurality of groups are present in the same network segment, the communication node located on the boundary with the adjacent group is provided with the function of discarding the frame from the other group without outputting the frame from the other port when receiving the frame from the other group at a certain port. Therefore, it is possible to prevent a network band from being consumed by the frame irrelevant to the group to which the communication node belongs.

Third Embodiment

In the second embodiment, the case where only one master station (that is, a communication management device) is present in the same network segment has been described. However, when a plurality of master stations are present in the same network segment in the case of the second embodiment and a multicast group is set for each of groups each including one master station and a plurality of slave stations present in the same network segment as described in the first embodiment, the need arises to store multicast addresses for determining whether it is necessary to repeat a frame by as much as the number of connected master stations. Therefore, in a third embodiment of the present invention, a case where a plurality of master stations are present in the same network segment is described.

For example, when a first group including a master station (A) and a plurality of slave stations (A) and a second group including a master station (B) and a plurality of slave stations (B) are present in the same segment, it is either the master station (A) of the first group or the master station (B) of the second group that serves as the communication management device 10. Accordingly, the same multicast address is set to all of the first and second groups. Furthermore, because of the presence of the first and second groups in the same segment, it suffices that the master station of each group distributes master identification information that is information for identifying the group in the same segment to each of the slave stations controlled by the master station and that this master identification information is stored in a frame communicated in each group so as to identify the frame communicated in each group. With a configuration of the second embodiment, for example, when the data-frame-communication processing unit 27 or 64 is to transmit information communicated in the group to which the data-frame-communication processing unit 27 or 64 belongs, it suffices to store this master identification information in the frame and to transmit the frame; otherwise, it suffices to transmit the frame without storing the master identification information in the frame. Further, when the data-frame-communication processing unit 27 or 64 receives a frame, it suffices to read the master identification information, to confirm whether the read master identification information coincides with the information held in the communication node including the data-frame-communication processing unit 27 or 64, to perform a receiving process of the information and a process of repeating the frame when the both master identification information coincides with each other, and to perform the frame without performing the receiving process of the information. While the case where the two groups are present in the same segment has been described, the same is true for a case where three or more groups are present.

According to the third embodiment, when a plurality of groups (a plurality of master stations) are present in the same segment, the communication nodes (the master stations and slave stations) present in the same segment transmit frames using the same multicast address irrespective of the groups to which the communication nodes belong and store the master identification information for identifying the groups in the respective frames. Therefore, the communication node located on the boundary with the other network can advantageously determine whether the communication node can pass the received frame in the same segment using only the multicast address assigned to the network to which the communication node belongs similarly to the second embodiment. Furthermore, the communication nodes in the same segment determine whether the received frame is for the group to which each communication node belongs by referring to the master identification information on the received frame. Therefore, it is possible to prevent the communication node belonging to another group from erroneously receiving data of a certain group even when a plurality of groups are present in the same segment.

A data communication method executed by the communication management device, the master stations, and the slave stations described above can be realized by causing a computer such as a programmable controller or a personal computer including a CPU (central processing unit) to execute a program in which process procedures of each of the communication nodes are written. In this case, the CPU (control unit) of the computer executes processing steps of the data communication method according to the program. These programs are executed by being recorded in a computer readable recording medium such as a hard disk, a floppy® disk, a CD (Compact Disk)-ROM (Read Only Memory), an MO (Magneto-Optical disk), or a DVD (Digital Versatile Disk or Digital Video Disk) and by causing the computer to read the program from the recording medium. In addition, these programs can be distributed via a network (communication line) such as the Internet.

Further, a communication management circuit in which circuits perform processes according to the above process procedures to realize the respective processing units described in the above embodiments can be used as the communication management device. Similarly, a communication circuit in which circuits perform processes according to the above process procedures to realize the respective processing units described in the above embodiments can be used as the master stations and slave stations.

Furthermore, an LSI (Large-Scale Integration) manufactured so that the processing units described in the above embodiments perform the processes according to the above process procedures can be used as the communication management device. Similarly, an LSI (Large-Scale Integration) manufactured so that the processing units described in the above embodiments perform the processes according to the above process procedures can be used as the master stations and slave stations. The communication management device is a device that manages communication in the same network segment. When one master station is present in the same network segment, the master station normally serves as the communication management device, and when a plurality of master stations are present in the same network segment, any one of the master stations serves as the communication management device. In this case, the other master stations are configured to include functions of the communication management device except for a communication management function.

INDUSTRIAL APPLICABILITY

As described above, the communication management device according to the present invention is useful for a network system that requires real-time data communication and is connected via Ethernet.

The invention claimed is:

1. A communication management device that manages data transmission while circulating a token frame indicating a transmission right among communication nodes according to a cyclic order in a group, the group being formed by connecting one communication management device and at least one slave station by an Ethernet® cable in a same network segment, the communication management device comprising:
   a logical-ring configuring unit that determines a transmission order of the token frame indicating the transmission right and configures a logical ring using the slave station and the communication management device present in a range where the token frame is transmitted by broadcast;
   a multicast-address generating unit that generates a multicast address from a Media Access Control (MAC) address of the communication management device by modifying a leading bit in the MAC address of the communication management device;
   a multicast-address storage unit that stores the multicast address;
   a multicast-address notifying unit that notifies the slave station configuring the logical ring of the multicast address; and
   a frame-communication processing unit that transmits a frame having a destination address to which the multicast address is set, determines whether the destination address of a received frame coincides with the multicast address stored in the multicast-address storage unit, and switches the frame without performing a receiving process of the frame when the destination address of the received frame does not coincide with the multicast address,
   wherein the multicast-address generating unit generates the multicast address by:
   converting the MAC address including the leading bit which is a unique address assigned to the communication management device into a binary form,
   modifying the leading bit in the binary form in the converted MAC address of the communication management device,
   converting the converted MAC address including the modified leading bit in the binary form from the binary form back to a hexadecimal form to obtain a modified MAC address, and
   assigning the modified MAC address of the communication management device as the multicast address for communication in the group.

2. The communication management device according to claim 1, wherein the frame-communication processing unit discards the frame without performing the receiving process when the destination address of the received frame does not coincide with the multicast address.

3. The communication management device according to claim 1, wherein the multicast-address generating unit generates the multicast address while setting the leading bit of a first octet to "1" out of the MAC address of 48 bits set to the communication management device.

4. The communication management device according to claim 1, wherein the logical-ring configuring unit detects communication nodes present in the same network segment as that to which the communication management device belongs, whenever the communication management device is turned on or at predetermined time intervals.

5. The communication management device according to claim 4, wherein the logical-ring configuring unit performs a logical-ring configuring process based on a connection relation of the communication nodes.

6. The communication management device according to claim 4, wherein the logical-ring configuring unit notifies the communication nodes a token cycle destination information which includes information specifying a first communication node that is to acquire the transmission right after a second communication node.

7. The communication management device according to claim 1, wherein the multicast-address notifying unit notifies the slave station and at least one other slave station configuring the logical ring of the generated multicast address such that the generated multicast address is stored in the slave station and said at least one other slave station, wherein the generated multicast address is communicated to only some slave stations in the logical ring such that said some slave stations form a sub group in the logical ring comprising said some slave stations and the one communication management device and wherein the logical ring comprises at least one other sub group formed of at least one different slave station.

8. A communication method for performing communications while circulating a token frame indicating a transmission right among communication nodes according to a cyclic order in a same network segment in which one communication management device and at least one slave station connected by an Ethernet® cable are present and managing data transmission by the communication nodes, the communication method comprising:
   a group forming step of causing the communication management device to form a group that performs communications while sequentially circulating the token frame using the slave station and the communication management device connected to each other in a range where a frame is transmittable by broadcast;
   a multicast address generating step of causing the communication management device to generate a multicast address used in communication in the group from a Media Access Control (MAC) address of the communication management device by modifying a leading bit in the MAC address of the communication management device;
   a multicast address notifying step of causing the communication management device to notify the slave station in the group of the multicast address;
   a transmitting step of causing the communication management device and the slave station to transmit the frame while setting the multicast address to a destination address; and
   a receiving step of causing the communication management device and the slave station to determine whether the destination address of the received frame coincides with the multicast address used in the group, to perform a receiving process when the destination address of the received frame coincides with the multicast address used in the group, and not to perform a receiving process when the destination address of the received frame does not coincide with the multicast address used in the group,
   wherein the multicast-address generating step comprises:
   converting the MAC address including the leading bit which is a unique address assigned to the communication management device into a binary form, modifying the leading bit in the binary form in the converted MAC address of the communication management device, converting the converted MAC address including the modified leading bit in the binary form from the binary form back to a hexadecimal form to obtain a modified MAC address, and assigning the converted MAC address of the communication management device as the multicast address for the communication in the group.

9. The communication method according to claim 8, wherein at the receiving step, the frame is discarded when the destination address of the frame does not coincide with the multicast address used in the group.

10. The communication method according to claim 8, wherein at the multicast address generating step, the multicast address is generated while setting the leading bit of a first octet to "1" out of the MAC address of 48 bits of the communication management device.

* * * * *